（12) United States Patent
Jeuk et al.

(10) Patent No.: US 11,424,989 B2
(45) Date of Patent: Aug. 23, 2022

(54) MACHINE-LEARNING INFUSED NETWORK TOPOLOGY GENERATION AND DEPLOYMENT

(71) Applicant: Cisco Technology, Inc., San Jose, CA (US)

(72) Inventors: Sebastian Jeuk, Munich (DE); Sridar Kandaswamy, San Jose, CA (US)

(73) Assignee: Cisco Technology, Inc., San Jose, CA (US)

(\*) Notice: Subject to any disclaimer, the term of this patent is extended or adjusted under 35 U.S.C. 154(b) by 0 days.

(21) Appl. No.: 16/901,558

(22) Filed: Jun. 15, 2020

(65) Prior Publication Data

US 2021/0392049 A1 Dec. 16, 2021

(51) Int. Cl.
*H04L 41/12* (2022.01)
*G06N 20/00* (2019.01)
*H04L 47/70* (2022.01)
*H04L 41/16* (2022.01)

(52) U.S. Cl.
CPC ............. *H04L 41/12* (2013.01); *G06N 20/00* (2019.01); *H04L 41/16* (2013.01); *H04L 47/829* (2013.01)

(58) Field of Classification Search
CPC ....... H04L 41/12; H04L 41/16; H04L 47/829; G06N 20/00
See application file for complete search history.

(56) References Cited

U.S. PATENT DOCUMENTS

| 8,005,879 B2 | 8/2011 | Bornhoevd et al. |
| 9,124,507 B1 | 9/2015 | Sella et al. |
| 10,148,551 B1 | 12/2018 | Wood et al. |
| 10,171,383 B2 | 1/2019 | Johnston et al. |
| 10,567,230 B1 | 2/2020 | Song et al. |
| 10,691,504 B2 | 6/2020 | Liu et al. |
| 10,693,711 B1 | 6/2020 | Garg et al. |
| 10,872,029 B1 | 12/2020 | Bawcom |
| 2003/0063571 A1 | 4/2003 | Ikeda et al. |

(Continued)

FOREIGN PATENT DOCUMENTS

| CN | 102868733 | 1/2013 |
| CN | 107819662 | 3/2018 |

OTHER PUBLICATIONS

Antonescu, Alexandru et al., "Dynamic Topology Orchestration for Distributed Cloud-Based Applications", Dec. 2012, pp. 1-9.

(Continued)

*Primary Examiner* — William G Trost, IV
*Assistant Examiner* — Christopher P Cadorna
(74) *Attorney, Agent, or Firm* — Lee & Hayes, P.C.

(57) ABSTRACT

Techniques are described herein for deploying, monitoring, and modifying network topologies comprising various computing and network nodes deployed across multiple workload resource domains. A deployment system may receive operational data from a network topology deployed across multiple workload resource domains, such as public or private cloud computing environments, on-premise data centers, and the like. The operational data may be provided to a trained machine-learning model, and output from the trained model may be used, along with constraint inputs and resource inventories of the workload resource domains, to determine updated topology models which may be deployed within the workload resource domains.

20 Claims, 9 Drawing Sheets

(56) References Cited

U.S. PATENT DOCUMENTS

| | | |
|---|---|---|
| 2006/0149782 A1 | 7/2006 | Yeh et al. |
| 2013/0091283 A1 | 4/2013 | Omar |
| 2014/0192676 A1 | 7/2014 | Sullivan |
| 2015/0188989 A1 | 7/2015 | Chaliparambil et al. |
| 2016/0094383 A1 | 3/2016 | Wang et al. |
| 2016/0188355 A1 | 6/2016 | Cao et al. |
| 2016/0191391 A1 | 6/2016 | Wood et al. |
| 2016/0321378 A1 | 11/2016 | Kagan et al. |
| 2016/0344772 A1 | 11/2016 | Monahan et al. |
| 2017/0048110 A1 | 2/2017 | Wu et al. |
| 2017/0104636 A1* | 4/2017 | Vora .................... H04L 41/0853 |
| 2017/0127427 A1 | 5/2017 | Claridge et al. |
| 2017/0207980 A1 | 7/2017 | Hudls et al. |
| 2017/0317780 A1 | 11/2017 | Wood et al. |
| 2019/0220321 A1 | 7/2019 | Yang |
| 2019/0363938 A1 | 11/2019 | Liebinger Portela et al. |
| 2020/0259715 A1 | 8/2020 | Schermann et al. |
| 2020/0358804 A1* | 11/2020 | Crabtree ............. H04L 63/1425 |
| 2021/0075816 A1* | 3/2021 | S ........................... G06F 21/577 |
| 2021/0367849 A1 | 11/2021 | Kandaswamy et al. |
| 2021/0367852 A1 | 11/2021 | Kandaswamy et al. |
| 2021/0409277 A1 | 12/2021 | Jeuk et al. |

OTHER PUBLICATIONS

Office Action for U.S. Appl. No. 16/915,706, dated Nov. 12, 2021, Jeuk, "Generation and Deployment of Inherited Network Topology Models", 24 pages.

\* cited by examiner

MACHINE-LEARNING INFUSED NETWORK TOPOLOGY GENERATION AND DEPLOYMENT

TECHNICAL FIELD

The present disclosure relates generally to deploying and instantiating computing and/or network topologies across multiple workload resource domains. In particular, the present disclosure relates to receiving operational data feedback from the topologies deployed multiple workload resource domains, and then updating the deployed topologies based on the operational data feedback.

BACKGROUND

Cloud computing involves using a network of servers hosted remotely on the Internet, rather than local servers or personal computers, to store, manage, and process data. Cloud computing networks for large-scale systems commonly may use deployment models, in which private clouds and/or on-premise infrastructures may be allocated for storing or processing private and secure data, while one or more public clouds may be used for storing or process other non-secure system data. These hybrid cloud computing environments may allow architectural flexibility and scalability with respect to processing demand, as well as allowing integration of specialized computational models.

When designing computing, storage, and network topologies within public cloud computing environments, cloud providers may use multiple deployment models that allow system administrators to select the particular services or applications to execute using public or private cloud resources, depending on the level of sensitivity of the data. However, hybrid cloud networks may be complex and costly to deploy and maintain, due to the potential functional disparities between the different cloud environments, dynamic alterations that may be performed within individual cloud environments after deployment of the topology, and the splitting of system management responsibilities between the public cloud providers, private cloud providers, and on-premise infrastructure administrators. For example, although deployment models for cloud-based topologies have been developed to improve consistency and uniform distribution of the functions across cloud environments, such deployment models may require complex filters such as application layer classification, and may require special-purpose virtual network elements in contrast to lower cost and more traditional enterprise edge internetworking devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
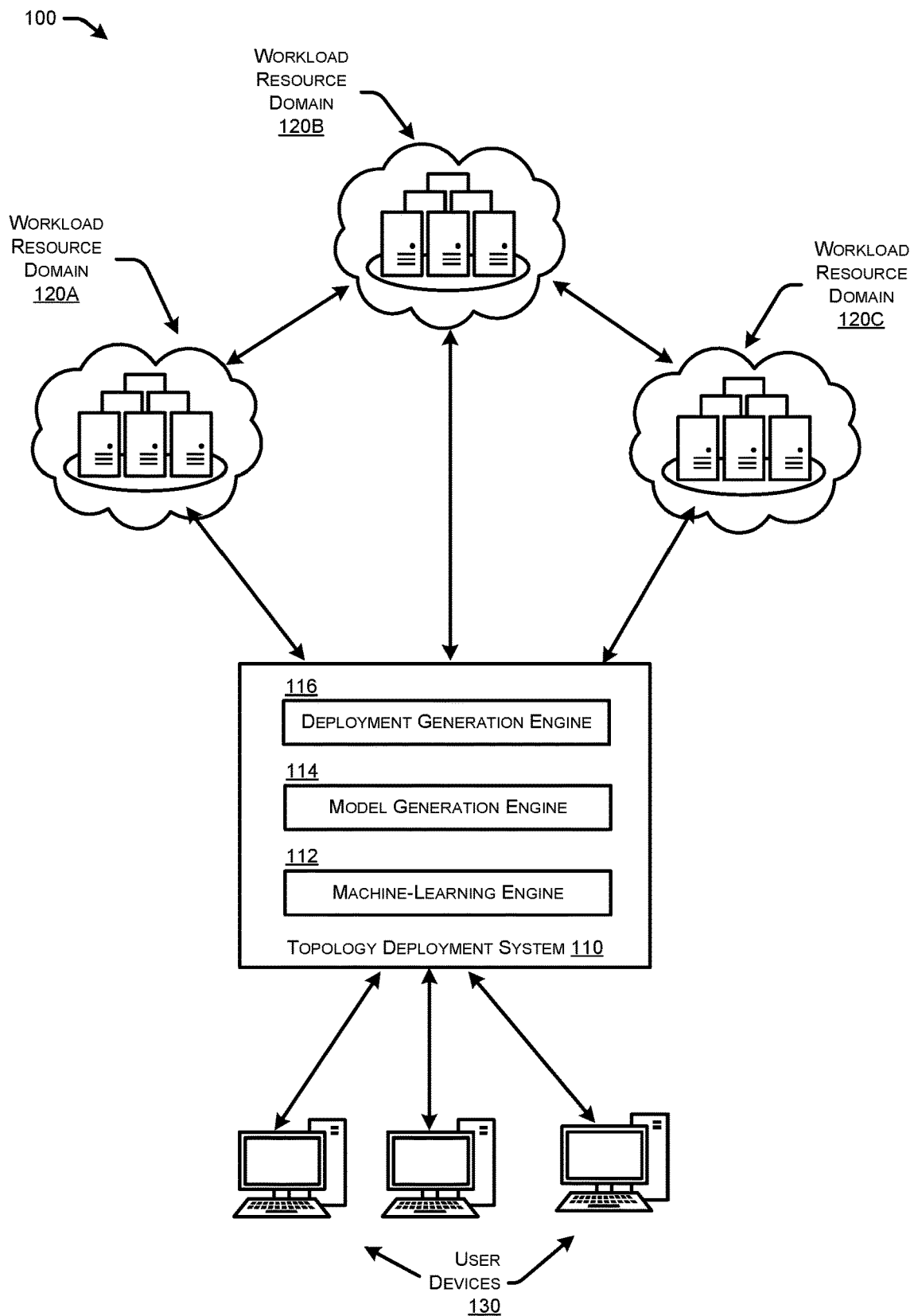
FIG. 1 illustrates a hybrid computing environment including multiple workload resource domains and a topology deployment system configured to generate and deploy network topologies within the hybrid computing environment.

This disclosure describes techniques for deploying, monitoring, and modifying network topologies operating across multiple workload resource domains. In accordance with certain embodiments, a topology deployment system may receive operational data from the various nodes of a network topology that is deployed across multiple workload resource domains. Such network topologies may be generated and deployed based on underlying logical and formal topology models, and each network topology may comprise one or more nodes (e.g., computing nodes, storage nodes, networking nodes, application nodes, etc.) operating in each of the multiple workload resource domains. The techniques described herein may further include providing the operational data received from the network topology to a trained machine-learning model, and receiving output from the model which may be used, along with the resource inventories from the workload resource domains and/or constraints associated with the network topology, to determine an updated topology model which may be used to modify the existing network topology deployed across the workload resource domains.

The techniques described herein may be performed as methods, or by computing devices and/or system having processors and memory units, or may be embodied in non-transitory computer-readable medium storing processor-executable instructions that, when executed by one or more processors, performs the technique described.

Example Embodiments

This disclosure describes techniques for deploying, monitoring, and modifying network topologies operating across multiple workload resource domains. Network topologies may refer to distributed computing systems in which a number of different nodes are individually designed and/or configured to perform particular functionality, and the various nodes may coordinate and communicate with other nodes to provide to the overall functionality of the network topology. The various nodes within a network topology may include, for example, nodes that are specialized and dedicated as network nodes, computing nodes, storage nodes, operating systems, software applications and services, and/or virtual computing machines or instances, etc. Different types and configurations of nodes may include specialized hardware and/or software components to perform the node functionality. Network nodes, for example, may include computing devices such as routers, servers, switches, load balancers, wireless access points, etc., running various software versions and/or having other attributes. Storage nodes may include various types of dedicated storage systems, compute nodes may include physical servers or other dedicated processing devices, and so on. Thus, network topologies may be used to implement enterprise systems and other large-scale computer systems.

In some embodiments, a network topology may be distributed across multiple different workload resource domains. A workload resource domain (or "resource domain") may refer to any computing resource container, such as public cloud computing environment, a private cloud computing environment, or an on-premise datacenter of an organization. Such network topologies may be referred to as hybrid topologies, in which the topology uses one or more nodes distributed across multiple different resource domains. Such hybrid topologies may provide potential advantages when designing and deploying large-scale computing systems. For example, certain network topologies may use deployment models in which private clouds and/or on-premise infrastructures are allocated to store and process private and secure data, while one or more public clouds may be used to store or process other non-secure system data. Hybrid network topologies also may allow for architectural flexibility and scalability with respect to changes in processing demand over time, as well as allowing integration of specialized computational models.

In accordance with certain embodiments described herein, a hybrid network topology may be deployed across multiple resource domains, and a deployment system may receive operational data from the various nodes of the network topology. Initially, logical deployment models may be generated, validated, optimized for deployment within the hybrid (e.g., multiple resource domain) environment, followed by the physical deployment of the models using internetworking devices and virtual processing resources. Logical (or intent-based) topology models may be created and validated, and then used for physical realization of hybrid network topologies that are functionally equivalent to the logical models. Formal methods may be used to validate the correctness of the logical model without the need for test-based verification, and deployment generation instructions may be used automatically generate a physical network topology for the deployment of the hybrid network topology, including a set of deployment instructions that may be transmitted between gateways in different resource domains.

After deployment and operation of a hybrid network topology over a period of time, various nodes and other components of the hybrid topology may transmit operational data back to the topology deployment system. Such operational data may be transmitted from individual nodes of the topology, and/or may be transmitted from other systems or devices operating within the various resource domains (e.g., system or network monitor devices, administrator user devices, etc.). The operational data received for the hybrid network topology may include, for example, one or more of the resource utilization at different times, bandwidth utilization at different times, changes to software systems or applications, tenant or client demography data at different times, monetary costs associated with the resource utilization, data metrics on support requests, and/or direct feedback or rankings from the administrators managing the resource domains.

In some embodiments, the operational data received from the nodes and/or resource domains of the network topology, may be provided to a machine-learning model trained to evaluate the current operational state and performance of the hybrid network topology. Outputs from the trained model may include current performance levels, performance trends and predictions, and/or optimization recommendations, all of which may be specific to individual nodes of the hybrid network topology or to the network topology as a whole.

Using the output from the trained machine-learning model, the topology deployment system may determine an updated topology model and/or may modify the existing network topology based on the updated topology model. In some examples, updated topology models may be based on outputs received from the trained model, along with additional data inputs such as the initial logical topology received from a system administrator or architect, resource inventories received from the resource domains, and/or predefined constraints associated with the network topology. Additionally, updates to a hybrid topology model, and the corresponding updates to the physical deployed network topology, may be performed periodically and/or recursively so that the hybrid network topology is continuously optimized and adjusted for performance and to provide flexibility and scalability with respect to changes occurring within the resource domains.

In various embodiments described herein, hybrid network topologies may include any number of nodes, and different types of nodes (e.g., compute nodes, networking nodes, storage nodes, software and virtual machine nodes, etc.), which may be deployed across various resource domains such as public or private clouds, on-premise data centers, etc. As noted above, machine-learning models may be trained to output performance levels for the hybrid network topologies over a previous time period, and/or network topology optimization recommendations, in response to the operational data from the existing network topology that may be input into the trained model. In some examples, a current performance level of the network topology may be compared to a first performance threshold to determine whether or not an updated topology model is to be generated, and/or a second performance threshold to determine whether or not the updated topology model is to be deployed within the resource domains. Additionally or alternatively, optimization recommendations may be received as outputs from the trained model, such as recommendations regarding a particular resource domain (e.g., cloud environment or datacenter) at which one or more nodes should be deployed, or recommendations about software configurations, storage types or locations, bandwidth usage restrictions, and the like. In some example, the optimization recommendations received via the trained model may be compared to a set of constraints previously defined for the deployed network topology, and if the optimization recommendations are not compatible with the constraints then an authorization request identifying the optimization recommendations may be transmitted to an administrator of the network topology.

Generally, the techniques described herein may improve techniques for at least (i) evaluating the performance of network topologies deployed across multiple resource domains, (ii) training machine-learning models to receive and process operational data from hybrid network topologies and to output corresponding performance levels and/or optimization recommendations, and (iii) determining updated models and deploying updated network topologies across multiple resource domains based on the trained machine-learning models.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a hybrid computing environment 100 including a topology deployment system 110, multiple resource domains 120, and one or more user devices 130. As described in more detail below, the topology deployment system 110 may be configured to generate, deploy, monitor, and modify hybrid network topologies within the computing environment 100.

As noted above, hybrid network topologies may refer to large-scale computing systems and/or solutions that are implemented by several different nodes of various different types (e.g., network nodes, storage nodes, compute nodes, software application or service nodes, virtual machines or instances, etc.), which are deployed across multiple different resource domains, and which interact and communicate to provide the functionality of the overall topology. Resource domains 120 may refer to a dedicated pool of computer resources from which nodes may be allocated. In this example, resource domain 120A may correspond to a first public cloud computing environment, resource domain 120B may correspond to a second public cloud computing environment or to a separate private cloud computing environment, and resource domain 120C may correspond to yet another public or private cloud computing environment or to an on-premise datacenter, and so on. Although only three resource domains 120 are shown in this example, it should be understood that a network topology may be deployed across any number of different public clouds, public clouds, private clouds, on-premise datacenters, and/or other resource pools, in various embodiments.

In various examples, each of the resource domains 120 (which also may be referred to as domain infrastructures) of the multi-domain environment 100 may generally represent or comprise a resource pool. The resource pool of each resource domain 120 may comprise a data center, multiple data centers within the same enterprise, multiple data centers across enterprises, etc. As a specific example, a campus network of a school may be a type of resource domain 120A that is connected to a data center running in another domain infrastructure 120B by a connection through one or more networks, such as the Internet. Both of the domain infrastructures 120A and 120B may further be connected to a public cloud provider 120C as a third domain infrastructure. This is one example of the types of domain infrastructures 120 that may be interconnected to create a multi-domain environment 100. Generally, a resource domain 120 may comprise a set of resources that are managed, operated, and/or owned by the same or by different entities. In one specific example, the multi-domain environment 100 may comprise a multi-cloud environment that includes multiple public clouds, multiple private clouds (e.g., enterprise networks), a public cloud in combination with a private cloud/network, etc. However, the multi-domain environment 100 may also be utilized in other technologies. For instance, the multi-domain environment 100 may comprise domains of different devices in an Internet-of-Things (IoT) environments where each domain is a different grouping of IoT devices, and the domains are interconnected to form the multi-domain environment 100. Generally, the multi-domain environment 100 may comprise groupings of devices in different technology areas and/or different types of devices assigned to multiple domains that are connected to each other.

In some embodiments, the topology deployment system 110 may be coupled directly or indirectly to a multi-resource domain network (e.g., multi-cloud network) that may include the Internet, one or more private clouds, public clouds, and/or other resource pools (e.g., on-premise datacenters). The topology deployment system 110 may include components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments.

The different nodes types that may operate within a hybrid network topology (e.g., network nodes, compute nodes, storage nodes, software application or service nodes, virtual machine instance nodes, etc.) each may correspond to or may be executed on one or more computers. As used herein, a "computer" may refer to one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, computer network devices such as gateways, modems, routers, access points, switches, hubs, firewalls, and/or any other special purpose computing devices.

In some embodiments, the topology deployment system 110 may include one or more of a machine-learning engine 112, a model generation engine 114, and/or a deployment generation engine 116. As described below in more detail, the machine-learning engine 112 may receive operational data from the hybrid topology deployed across the resource domains 120, and may provide the operational data as input to a trained machine-learning model. The model generation engine 114 may determine an updated topology model for a network deployment based on a logical model input, as well as resource inventories of the resource domains 120, constraint input provided by a system architect or administrator, and/or the output of the trained model(s) executing within the machine-learning engine 112. The model generation engine 114 may provide the topology model for the network deployment to the deployment generation engine 116, which may include various subcomponents configured to verify and optimize the network topology, as well deployment generation instructions programmed or configured to generate the topology within the hybrid environment 100.

Although not shown in FIG. 1 so as not to obscure the elements depicted therein, a hybrid computing environment 100 (which also may be referred to as a multi-cloud network, or a multi-resource pool network, etc.) may include any combination of one or more data communication networks through which the resource domains may communicate. Such data communication networks may include local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. Resource domains 120 (e.g., private cloud network(s), public cloud network(s), on-premise datacenter(s), etc.), as well as topology deployment systems 110 and other elements of the environment 100 may each comprise a compatible interface and may be programmed or configured to use standardized protocols for communication across the networks such as TCP/IP, Bluetooth, and higher-layer protocols such as HTTP, TLS, and the like.

Each resource domain 120 may be implemented using a server-class computer or other computers having one or more processor cores, co-processors, or other computers. Resource domains 120 may include physical server computers and/or a virtual server instances stored in a datacenter, such as through cloud computing. Additionally or alternatively, resource domains 120 such as public and/or private cloud networks, may comprise one or more applications executing on a server computer system which comprises instructions for application modeling and appliance/hardware mapping. Resource domains 120 may further comprise one or more network policies using notions such as templates or profiles that can be applied to different points in the hybrid computing environment 100.

In some embodiments, the topology deployment system 110 may be distributed across one or more of the resource domains 120, which may be bridged by a cloud service configured to integrate and virtualize various hierarchical layers of different public or private cloud networks, on-premise datacenters, etc. The individual resource domains 120 may comprise respective gateways (e.g., cloud gateways) that may translate cloud storage Application Programming Interfaces (APIs) to block-based storage protocols by using standard network protocols which integrate with existing applications within hybrid computing environment 100.

As noted above, in some embodiments operational feedback data may be received from a network topology deployed across multiple resource domains 120. However, before any operational feedback data may be received, the network topology may be initially determined and deployed within the hybrid network environment. Such deployment of network topologies across multiple resources may include receiving logical model input describing a prospective network topology and/or one or more predefined constraints to be placed on the formal/physical model. In some embodiments, the logical model input and/or the constraints may be received from a tenant user or system administrator via a user device 130. The topology deployment system then may automatically generate a physical network topology for the hybrid network deployment, including transmitting sets of deployment instructions from the deployment generation engine 116 to gateways within the different resource domains 120. In some embodiments, the physical network topology determined within the model generation engine 114 may be subjected to formal model checking to determine whether it is functionally equivalent to the logical model input. Upon establishing functional equivalence between the logical model input and the physical topology that was generated, the deployment instructions may be considered verified, and an actual realization of the generated hybrid network topology may be initiated.

In some embodiments, the input received from the user device 130 describing the prospective network topology may account for multiple resource domains 120, including at least one public cloud network associated with a public cloud network provider, and at least one private cloud network associated with an enterprise. The enterprise may include programs, service models, and applications which reside in an on-premise datacenter of the enterprise. Such programs, service models, and applications may include software-as-a-service (SaaS) programs, platform-as-a-service (PaaS) programs, infrastructure-as-a-service (IaaS) programs, Load Balancing-as-a-service (LBaaS) programs, application frontends, application backends, application classification programs, firewalls or others.

A partial order reduction model checking also may be used by the model generation engine 114 for model verification in some embodiments. In some examples, the constraint inputs received from network tenants, administrators, etc., via user devices 130 may specify one or more constraints upon the realization of the logical topology within individual private cloud computing infrastructures and/or individual public cloud computing infrastructures within the hybrid network environment. In such cases, the model generation engine 114 may optimize the intermediate topology based upon the constraint input, including automatically remapping the intermediate topology to an optimized network topology by moving functional elements (e.g., nodes or groups of nodes) from a first resource domain (e.g., a public cloud) in the intermediate topology, into a different resource domain (e.g., a private cloud or on-premise datacenter) in the final formal network topology. In some cases, constraint inputs may specify one or more attributes of a private cloud infrastructure or public cloud infrastructure.

Although the hybrid computing environment 100 may be considered a single computer network, as may each individual resource domain 120 within the computing environment 100. As noted above, each of the networks may include a number of network devices configured for intra- and internetwork communications. Such network devices may include any type of networking device, such as servers, switches, routers, hubs, bridges, gateways, modems, repeaters, access points, etc. Additionally, these network devices may include personal, user devices such as phones, tablets, wearables devices, or other personal computing devices. The network devices may comprise physical nodes (e.g., processors, chipsets, devices, etc.), virtual nodes (virtual machines, containers, etc.), and/or any combination thereof.

Individual resource domains 120 may, in some cases, correspond to datacenters operating in one or more physical locations. Such datacenters (or other physical locations) may be physical facilities or buildings located across geographic areas that designated to store networked devices that are part of the corresponding resource domain 120. These data centers also may include various networking devices, as well as redundant or backup components and infrastructure for power supply, data communications connections, environmental controls, and various security devices. In some examples, a resource domain 120 may include one or more virtual data centers which are a pool or collection of cloud infrastructure resources specifically designed for enterprise needs, and/or for cloud-based service provider needs. Generally, the resource domains 120 (physical and/or virtual) may provide basic resources such as processor (CPU), memory (RAM), storage (disk), and networking (bandwidth). However, in some examples the network devices of the resource domain 120 might not be located in explicitly defined datacenters, but may operate from other physical locations.

The user devices 130 through which the topology deployment system 110 may be controlled, may comprise any type of computing device through which a user is able to interact with other devices (e.g., phones, tablets, personal computing devices, wearable devices, network devices, etc.). In some examples, users of the user devices 130 may have registered accounts with the topology deployment system 110 in order to generate models, create and modify topologies, and deploy topologies within the resource domains 120. For instance, a topology design tool, constraint input tool, and/or optimization or recommendation tools may be provided by the topology deployment system 110 and accessible to authorized users at user devices 130 via a client portal (e.g., command line interface (CLI), application programming interface (API), web-based portal, etc.) and/or user interfaces. The user devices 130 may operate within and communicate with the topology deployment system 110 (and/or any other devices in the computing environment 100) over one or more networks, including any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

As described herein, the topology deployment system 110 may include one or more computing devices (e.g., a single device, multiple devices, network(s) of devices, etc.) comprising one or more processors configured to execute various computer-executable instructions. Additionally, topology deployment system 110 may include components, modules, etc., that are stored on non-transitory computer-readable media and configured to perform the techniques and operations described herein as being performed by the topology deployment system 110. For instance, the topology deployment system 110 may include the machine-learning engine 112, the model generation engine 114, the deployment generation engine 116, and/or any other number or arrangement of components. The components described herein are merely illustrative, and any number or configuration of components may be utilized to perform the techniques described herein.

Figure 2:
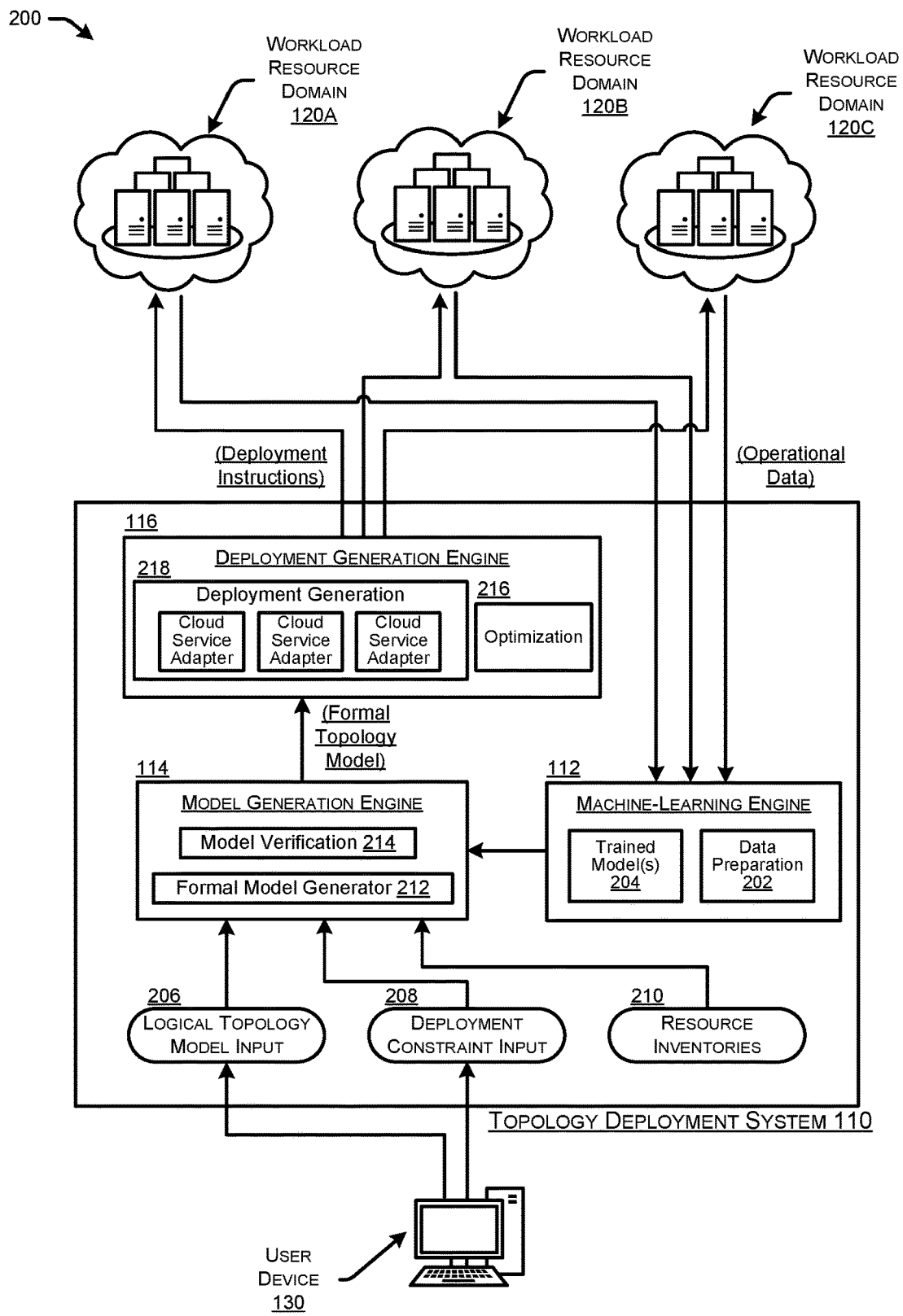
FIG. 2 illustrates a system diagram of an example topology deployment system configured to execute a machine-learning model that is trained to determine updated topology models and/or to deploy the updated topology models, based on operational data received from an existing network topology deployed across multiple workload resource domains.

FIG. 2 illustrates a system diagram of an example topology deployment system configured to execute a machine-learning model trained to generate and deploy updated network topologies, based on operational data received from an existing network topology deployed across multiple resource domains. The computing environment 200 illustrated in this example may be similar or identical the computing environment 100 discussed above in reference to FIG. 1. Thus, computing environment 200 includes a topology deployment system 110, multiple resource domains 120 (e.g., one or more public clouds, private clouds, on-premise datacenters, and/or other resource pools), and a user device 130 through which authorized users (e.g., topology tenants, clients, administrators, etc.) may provide inputs to and may interact with the tools and user interfaces of the topology deployment system 110. Thus, this example may illustrate certain embodiments of the computing environment 100 described in FIG. 1, and in particular, certain features and embodiments of the machine-learning engine 112, model generation engine 114, and deployment generation engine 116.

As described in the embodiments below, these components may be used to receive and process feedback data from a network topology deployed across multiple resource domains 120. The topology feedback data may include operational data received from the nodes of the topology and/or other components within the resource domains 120, and may be provided to a trained machine-learning model. Output from the trained model then may be used, in conjunction with other topology data and constraints, to evaluate the deployed network topology, generate an updated topology model, and/or modify the deployed network topology based on the updated model.

The machine-learning engine 112 may receive feedback data from the existing network topology, in the form of operational data received from the topology nodes and/or other devices systems within the resource domains 120 in which the topology is deployed. In some embodiments, operational data may be transmitted directly from the individual nodes of the topology (e.g., network nodes, compute nodes, storage nodes, containers, software applications or services, virtual machine instances, etc.). Additionally or alternatively, operational data of the topology may be collected indirectly and transmitted by monitoring devices or systems of the resource domains 120 (e.g., network monitors, performance monitors, administrative systems, etc.). The operational data may be transmitted through the gateways and/or other edge computing devices of the resource domains 120, to the machine-learning engine 112, either on a periodic basis (e.g., every second, every 10 seconds, every minute, every hour, etc.) or when triggered by specific events (e.g., performance thresholds, software or system errors, support ticket creation, etc.), and may be different for different sources of the operational data.

The operational data received by the machine-learning engine 112 may generally correspond to data collected after an initial deployment of the network topology within the resource domains 120, and during time periods concurrent with the execution/operation of the various nodes of the topology, so that the operational data may provide practical status and system feedback data, and may take into account dynamic updates occurring at the nodes or elsewhere within the resource domains 120 which could not be predicted during the initial model generation process for the topology. The specific types of operational data, and frequencies at which the data is transmitted, may depend on the particular types, functionalities, and configurations of the nodes within the topology. For instance, compute nodes may provide one set of operational data, network nodes may provide a different set of operational data, software services and virtual machine instances may provide still different sets of operational data, and so on. Specific (non-limiting) examples of operational data may include, resource utilization data for nodes within the topology, bandwidth utilization data for network nodes and/or for networks connecting other nodes/sections of the topology, software updates (including service level agreement changes) made to software applications or services executing within the topology, monetary costs associated with resources provided by external resource domains 120 (e.g., public or private clouds) including any changes to the costs/fee structures of the external resource domains 120. Additionally, any of these operational data may be specific to individual nodes of the deployed topology, to the individual resource domains 120, or to the topology as a whole. In some embodiments, similar or identical operational data may be received from nodes and/or subnetworks that are not included within the deployed network topology, as operational changes within these other nodes or subnetworks may indirectly affect the performance, stability, or scalability of the deployed topology.

Additional examples of the operational data that the machine-learning engine 112 may receive from the deployed topology includes tenant (or client) demography data corresponding to the end users of the topology. Such demography data may include, for example, data metrics for the connection types, access networks, network protocols, and client portals/applications used by the tenants for accessing the topology, the times, time zones, and geographic locations from which tenants for access the topology, the peak usage hours for the topology, and the like. Still other examples of the operational data received by the machine-learning engine 112 may include the number and type of system errors and/or support requests received in connection with the execution of the topology, or express feedback (e.g., rankings, optimization suggestions, topology recommendations, etc.) provided by system administers of the resource domains 120 and/or of the individual systems operating therein. Additionally or alternatively, the machine-learning engine 112 may receive as input data one or more application performance indicators. In some cases, application performance indicators may be sourced differently, for instance, through an application performance monitoring tool (e.g., AppDynamics performance monitoring capabilities). In some instances, the machine-learning engine 112 also may receive deployment mode information. For example, in case of a service mesh, side cars may provide additional information relevant for the underlying topology, and hence for the performance of the supporting application. Additionally, in some cases the machine-learning engine 112 may receive as input data controller information. For instance, in the case of an application centric infrastructure (ACI), an application policy infrastructure controller (APIC) can provide details about how different domains are deployed (e.g., through the use of remote leaf switches), which may influence the way the topology is built.

In addition to receiving operational data from the deployed topology, in some examples the machine-learning engine 112 also may receive as input data a desired state of the network topology. In such examples, the topology development system 110 may determine a desired state of the network topology using various techniques, including using service level agreements (SLAs) associated with the topology, templates, and/or tenant/application specific metadata. The topology development system 110 use the various techniques to determine desired state(s) of the topology and then transmitted to the machine-learning engine 112 for analysis. In some examples, the desired state of the network topology may correspond to the intent of the network topology. In such examples, the desired state (and/or intent for use) of the network topology may be used in conjunction with network topology operational data as training data for the machine-learning model(s), and/or as input data within the trained model(s) 204 are accessed as executed.

In various examples, the desired state network topology may be defined in various different ways. In some instances, a tenant may define the desired state for the topology by defining it through API calls or a graphical user interface in which the tenants specifies what is expected from the environment. As one example, a tenant-defined desired state may indicate that the deployment should use containers. As another example, a tenant-defined desired state may indicate more complex details for the deployment, such as bandwidth requirements for specific links between micro-services in the service mesh environment (e.g., a micro-service on a particular cloud may require 10 Mbps to communicate with a different micro-service that runs in a different resource domain).

Additionally or alternatively, service level agreements (SLAs) can used to specify upper or lower limits of desired states for deployed topologies. For example, an SLA may specify that a particular micro-service based service-mesh requires at least 10 CPU cores that can be shared in any way across all micro-services and resource domains. As another example, an SLA may specify upper limits to be fulfilled. In these examples and others, the topology deployment system 110 may extract such information from the SLA and provide the information as input parameters for the machine-learning engine 112, in order to further enhance the optimized formal model of the deployment.

In some embodiments, the machine-learning engine 112 may include a data preparation system 202 configured to receive, accumulate, and format the operational data received from the various nodes and resource domains 120 of the topology. For example, the data preparation system 202 may accumulate and store the most recent data metrics relied upon by the trained models 204, format the data appropriately, and discard any received operational data that is not relied upon by the trained models 204. The machine-learning engine then may access and execute one or more trained machine-learning models 204, and provide as input to the trained models 204 the appropriate operational data received from the deployed topology. In various implementations, one or more trained models 204 may be used, corresponding to any or all of machine-learning algorithms described herein.

In some examples, the output of the trained machine-learning model(s) 204 may include a current/recent performance level for any of the individual nodes within the network topology, or current/recent performances level for groups of nodes, subnetworks, and/or for the topology as a whole. Performance levels may be expressed, for example, on a numeric scale or as a percentage of an "acceptable" or "optimal" performance level for the node, subnetwork, or topology, etc. In some examples, the trained models 204 may output a matrix of current performance levels associated with the different nodes of the network topology.

Additionally or alternatively, the trained models 204 may be configured to output specific optimization recommendations for the deployed topology. Examples of such optimization recommendations may include individual updates to the formal/physical model of the network topology, such as reallocating a particular node or group of nodes onto a different resource domain 120. For instance, a trained model 204 may output an optimization in which certain front-end (e.g., client facing) components of the topology are migrating to a public cloud, while the backend components remain allocated at an on-premise datacenter. Another output may correspond to a recommended optimization to reallocate a container running on a compute node with a high level of utilization to a different compute node with lower optimization. Other examples of optimization recommendations may include changing the software applications or services deployed within the network topology (or particular software configurations), changing the numbers or locations of virtual machines or instances operating within the deployment, or changing the available compute or storage allocations of any nodes or node groups, or the bandwidth allocations between any nodes of the topology. Thus, optimization recommendations may include allocating or removing one or more nodes of any type from the existing topology, migrating or reallocating nodes or groups of nodes to different resource domains 120, node configuration changes, and/or any other possible modification to the formal physical model of the network topology.

As described below in more detail, trained models 204 may provide their respective outputs, such as performance level data and/or optimization recommendations, based on the received operational input data, taking into account (e.g., during the model training processes) the structure of the topology and the types and characteristics of individual nodes, as well as constraints, resource inventories, etc., using the historical performance data for previous topologies from which the models 204 were trained.

In some embodiments, the outputs from trained models 204 may include recommendations based on trends or patterns that may be detected based on the operational data received from the deployed topology. In such cases, one or more trained models 204 may be implemented as recurring machine-learning models, in which certain outputs from the models 204 are fed back into the same models 204 as inputs, thereby allowing the models 204 to detect complex trends or patterns within the operational data of the topology. In such examples, one or more trained models 204 may identify simple trends or complex patterns in data metrics such as network usage, resource utilization, resource cost, overall system performance, stability, etc., and may recommend model-level optimizations to avoid future spikes in resource usage or costs, future network bottlenecks, future performance or stability issues, and the like. Based on the types and configurations of the machine-learning algorithms used, the training/testing data, and the training processes used, detecting trends or patterns and making corresponding recommendations may include simply recognizing usage change trends (e.g., changes in bandwidth or resource utilization, changes in cost, changes in performance, etc.), and/or may include significantly more complex analyses based on various changes and patterns in any combination of the operational data described above.

As shown in FIG. 2, the output from the trained models 204 may be provided from the machine-learning engine 112 to the model generation engine 114. As discussed above, the model generation engine 114 may be configured to determine network topology models for prospective deployed topologies (and/or modifications to existing deployed topologies) across multiple resource domains 120. When determining an initial formal/physical model for a network deployment, the model generation engine 114 may use a logical model initially provided for the topology, one or more constraint inputs, and resource inventory data for the resource domains 120. However, when determining modifications for topology models based on feedback (e.g., operational data) received from the existing deployed topologies, the model generation engine 114 may use not only the logical model, constraints, and resource inventories, but also may use the output from the trained models 204.

Within the model generation engine 114, a formal model generator 212 may be configured to determine a modified formal model (e.g., a physical network topology for the deployment network topology across multiple resource domains 120). The formal model generator 212 may determine the modified formal model based on the logical topology input 206, the deployment constraint input 208 (or constraints 208), the resource inventories 210 for the resource domains 120, as well as based on the output from the machine-learning engine 112.

Constraints 208 (also referred to as deployment constraints) may be predefined deployment conditions, specifications, or limitations that are provided by an administrator user and/or may be based on predefined policies of the network topology. Constraints may be associated with any node or groups of nodes within the deployed topology, or with the topology as a whole. Examples of constraints 208 may include requirements for specific nodes to be deployed on specific resource domains 120, requirements for groups of nodes to be deployed together on the same resource domains 120, requirements for minimum or maximum amounts of compute resources, storage resources, and/or network bandwidth to be provided to nodes or groups of nodes, etc. Additional examples of constraints 208 may include a specified number of virtual machine instances to be instantiated, specific types of software products or software configurations, and/or limits on pricing or cost or minimum amounts of storage, and the like. Still other examples of constraint inputs 208 may include but are not limited to placement of network functions within a resource domain 120, sensitivity level of data in a resource domain 120, capacity expectation of resource domain 120, and data traffic expectations.

Resource inventories 210 may define the available resources within each of the resource domains 120, thus determining the limits for prospective deployments across the resource domains 120 (e.g., multi-cloud deployments, hybrid network deployments, etc.). The particular data within resource inventories 210, and which components collect the resource inventories and provide the data to the topology deployment system 110 may vary in different embodiments. In some examples, a resource inventory may include data specifying which resource domains 120 are available, the specific resources that are available within each resource domain 120, such as the types of network devices and capabilities, the types of storage devices, the processing units, software services, and/or the types of virtual machine images that are available.

Constraints 208 and/or resource inventories may be provided by a user or an administrator via a user device 130, or other components within the computing environment 200. Additionally or alternatively, resource inventory and constraints may be obtained programmatically from files or configuration data that has been stored for other purposes in any of the elements of computing environment 200. For example, network management computers within resource domains 120 may store or expose network element inventory data or constraints to API calls, parameterized URLs or other programmatic calls, and the topology deployment system 110 may be programmed to issue such calls to the resource domains 120 to obtain responses, objects or download files that contain resource inventories 210 and/or constraints 208. As shown in this example, both constraints 208 and the resource inventory data 210 may be received and used as inputs to the model generation engine 114 to generate an optimized realization of the network services and other available resources. Constraints 208 and resource inventories 210 may change dynamically based on workload, system/software upgrades, and other factors that may change during the operation of the deployed network topology.

As discussed above, the output from the machine-learning engine 112 may include, for example, performance data associated with the deployed topology and/or optimization recommendations for modifying the deployed topology. The model generation engine 114 may use the outputs from the machine-learning engine 112 to determine an updated formal model for the topology, that is, the physical network topology to be deployed across the resource domains 120. For example, if performance data received from the machine-learning engine 112 indicates low performance (e.g., a bottleneck) for a node or a group of nodes, or across the topology as a whole, the formal model generator 212 may allocate additional nodes, increase the resource amounts allocated to certain nodes, and/or may migrate a set of nodes to a different resource domain 120. In other examples, if optimization recommendations are received from the machine-learning engine 112, the formal model generator 212 may analyze the recommendations and incorporate one or more of the recommendations into the updated formal model. Additionally or alternatively, the outputs the from the trained machine-learned model(s) may be used to optimize use of service-level agreements (SLAs), based on the inputs to the model(s), which may lead to different deployments to assure the SLAs are complied with in a sufficient and/or optimal manner.

After generating one or more prospective modified network topologies, based on the output from the machine-learning engine 112, as well as based on the logical model input 206, constraints 208, and resource inventories 210, the model generation engine 114 may validate and/or optimize the model using the model verification component 214, which also may verify the functional equivalency of the modified network topologies to the logical model input 206. The validated modified network topology then may be provided to the deployment generation engine 116, which may use an optimization system 216 and deployment generation system 218 to modify the physical network topology for deployed network topology, by transmitting sets of deployment instructions from to gateways within the different resource domains 120 to implement the determined updating of the network topology. In some embodiments, one or more cloud service adaptors may be used to generate specific configuration instructions for the resources in the various resource domains 120 (e.g., private clouds, public clouds, and/or on-premise enterprise networks of which the topology deployment system 110 may be a part). The cloud service adaptors may comprise executable code that causes generation of topologies specific to different technologies or services that are available only in specific different resource domains 120. Examples include NMS or AWS, where NMS and AWS are two different cloud service providers each providing at least a portion of a public cloud infrastructure in which a network topology may be deployed.

The specific configuration instructions generated by the cloud service adaptors may be provided as input to optimization system 216, which in some embodiments also may receive constraint input 208 as input. In such cases, the configuration instructions may be processed based on the constraint input 208 to remap the network topology to an optimized version that attempts to fulfill as many constraints as possible that are represented in the constraint input 208. The resulting topology may be verified for functional equivalence with the input model represented in logical model input 206. In certain embodiments, model verification instructions may be programmed to implement partial order reduction techniques for verification.

Figure 3:
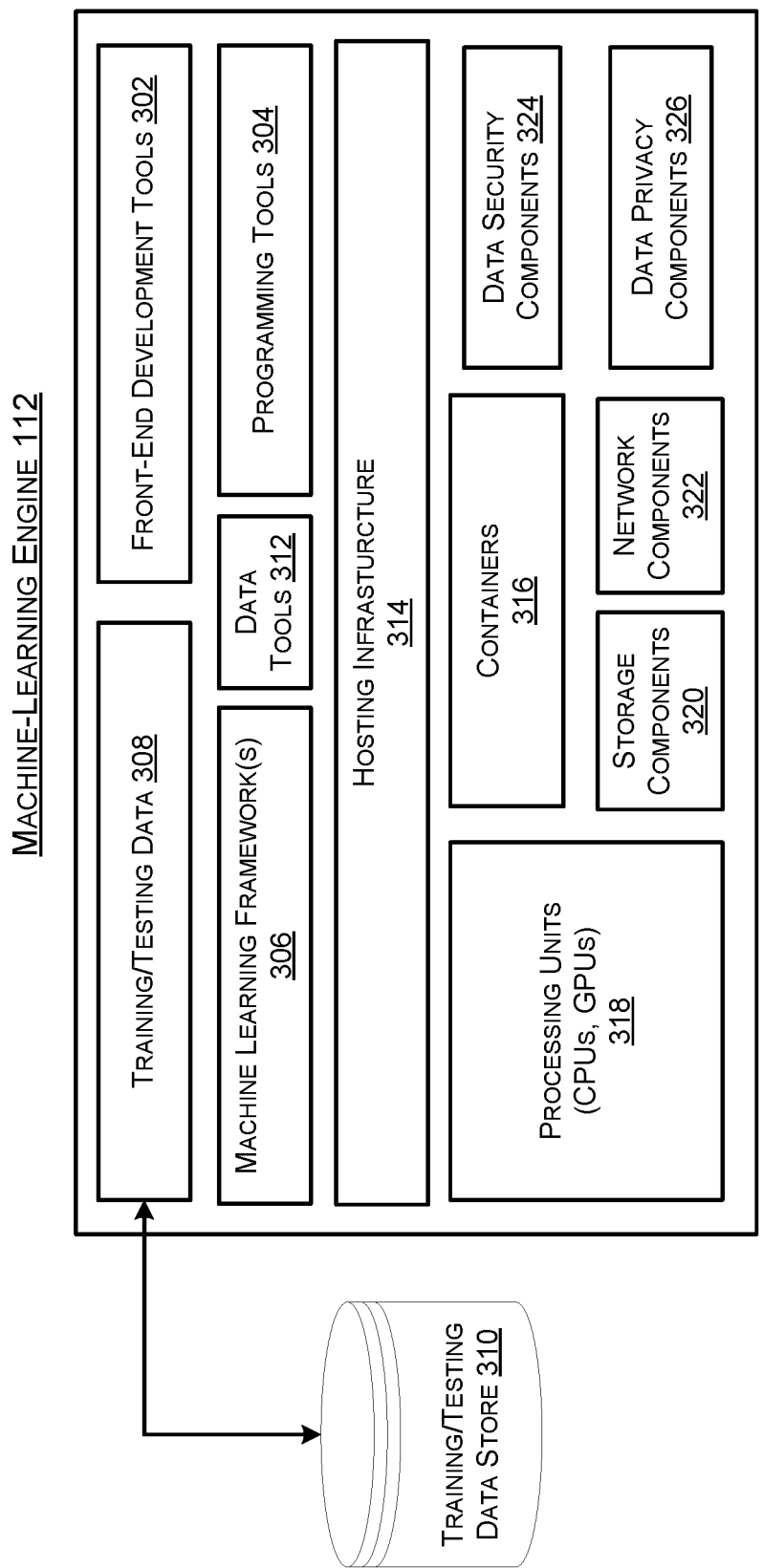
FIG. 3 illustrates a system diagram of an example machine-learning engine configured to train, evaluate, and execute machine-learning models, including models particularly trained based on operational data received from a network topology deployed across multiple workload resource domains.

FIG. 3 illustrates a system diagram of an example machine-learning engine 112 configured to train, evaluate, and execute machine-learning models. The machine-learning engine 112 shown in this example may represent a particular embodiment of the corresponding machine-learning engine 112 described above. Thus, machine-learning engine 112 may be configured particularly to generate and train models based on operational data received from a network topology deployed across multiple resource domains.

The machine-learning engine 112 may include one or more front-end development tools 302. Such development tools 302 may, for example, support machine-learning experiments, create a machine-learning solution architecture and/or a data architecture, as well as automating tasks such as integration, deployment, and monitoring. In some embodiments, the front-end development tools 302 may be web-based application tools that support creation and sharing documents containing live code, equations, visualizations and narrative text. Such tools may provide functionality for machine-learning development steps such as data cleaning and transformation, numerical simulation, statistical modeling, data visualization and testing/tuning machine learning models.

Programming tools 304 may correspond to the particular programming language(s) used for developing machine-learning applications. Languages such as PYTHON and JAVA may be advantageous for creating machine learning applications, including a rich toolset and support for fast iterative experimentation, as well as application speed in both production and development.

Machine-learning framework 306 may include software building blocks for designing, training and validating machine-learning model. The machine-learning framework 306 may include application programming interfaces (APIs) for the programming tools 304.

Training and testing data for the machine-learning models to be generated and trained may reside within the machine-learning engine 112 (e.g., training/testing data 308) and/or in one or more external data stores 310. Internal and external databases/data stores 308-310 may implement a data architecture with separate domains (e.g., business data, application data, technical data, etc.). In some embodiments, the data may include details of previously implemented network topologies, such as the structure of the topology and the types and characteristics of nodes, constraints, resource inventories, as well as historical performance data for the previous topologies. Data stores 308 may support multiple data sources from which training testing data may be retrieved, including workflow resource domains 120 associated with the current enterprise and/or other enterprise systems. The data stores 308 and 310 may support large quantities of training data, which may include structured data, unstructured data, metadata and semi-structured data received from public and private cloud computing environments, enterprise on-premise datacenters, and other resource domains 120.

The data tools 312 implemented within the machine-learning engine 112 may include, for example, data visualization and viewer tools, data exploration tools, data filtering, transformation, and labelling tools, data anonymizer tools, data encryption/decryption tools, data search/analytics tools, and the like. Data tools 312 also may be used by the machine-learning engine 112 to prepare the data pipeline, and find open datasets that may be used for machine-learning application. See the reference section for some tips. Such tools 312 may be visual and/or web browser-based (e.g., using Document Object Model (DOM) in some embodiments, or may be non-visual and non-web based which may save processing resources.

The hosting infrastructure 314 of the machine-learning engine 112 may include a platform capable of running the machine-learning application(s). The hosting infrastructure 314 may be used for development and training and machine-learning models, as well as production. In some embodiments, the hosting infrastructure 314 may include any or all of a physical housing and power supply, operating system (e.g., including backup services), network services, disaster recovery capabilities, operating services (e.g., deployment, administration, scheduling, and monitoring), and/or availability services. In some examples, the hosting infrastructure may leverage one or more commercial cloud platforms as an external cloud hosting infrastructure, while in other examples the hosting infrastructure 314 may be implemented internally within an on-premise data center. Additionally, the hosting infrastructure 314 may be configured to provide security and operating system updates automatically, without minimal or no application impact.

Containers 316 may be used within the hosting infrastructure 314 in some embodiments, to increase flexibility when developing and deploying machine-learning applications. Large clusters for machine-learning applications may be deployed on containers 316, leveraging the container technology to provide performance advantages and/or additionally flexibility. Containers 316 also may be used for development, hosting, integration, and testing.

Processing unit(s) 318, which may include one or more central processing units (CPUs) and/or graphics processing units (GPUs). In some embodiments, GPUs may provide advantages over CPUs for the large-scale and intense number calculation operations that may be performed in machine-learning applications. Processing units 318 also may include tensor processing units (TPUs), which include artificial intelligence (AI) accelerator application-specific integrated circuits (ASICs) for supporting machine-learning applications.

Each of the various systems and subcomponents of the machine-learning engine 112 described above may use one or more underlying storage components 320 and network components 322. Additionally, in some embodiments, the machine-learning engine 112 may include one or more integrated data security components 324 and/or data privacy components 326. For example, security components 324 and/or private components may include functionalities for training/testing machine-learning models on anonymized data sets, and/or using encryption on data to train/test machine-learning models.

FIGS. 4, 5, 6A, and 6B illustrate flow diagrams of example methods 400, 500, 600A, and 600B, respectively, each of which illustrate aspects of the functions performed at least partly by device(s) included in the topology deployment system 110 as described above in FIGS. 1-3. The logical operations described herein with respect to FIGS. 4, 5 6A, and 6B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4, 5 6A, and 6B and described herein. These operations can also be performed in parallel, or in a different order than those described herein. Some or all of these operations also may be performed by components other than those specifically identified. Although the techniques described in this disclosure is with reference to specific components, in other examples, the techniques may be implemented by less components, more components, different components, or any configuration of components.

Figure 4:
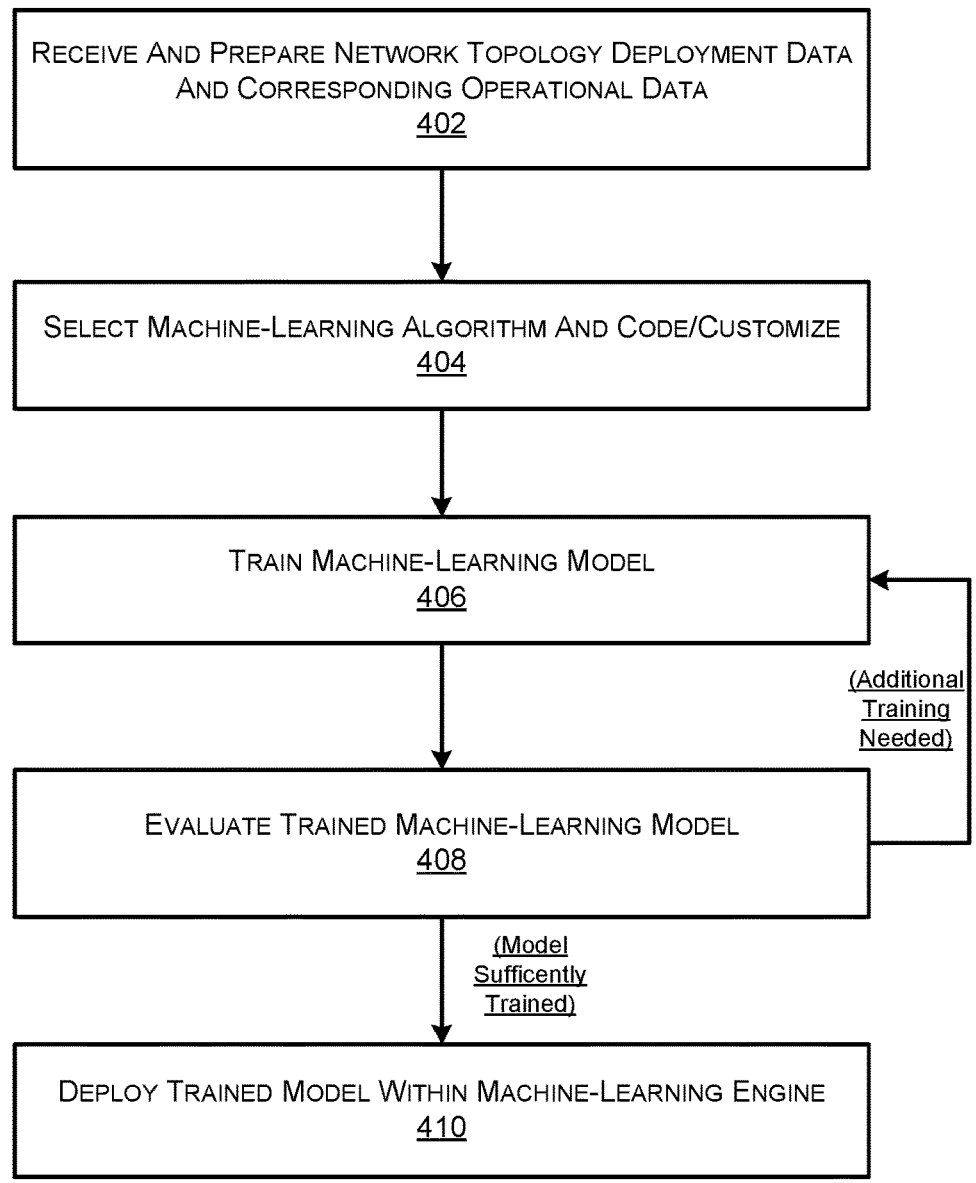
FIG. 4 illustrates a flow diagram of an example method for training and evaluating a machine-learning model based on operational data received from a network topology deployed across multiple workload resource domains.

FIG. 4 illustrates a flow diagram of an example method 400 for training and evaluating a machine-learning model based on operational data received from a network topology deployed across multiple resource domains 120. In some examples, method 400 may be performed by a system comprising one or more processors and one or more non-transitory computer-readable media storing computer-executable instructions that, when executed by the one or more processors, cause the one or more processors to perform the steps of method 400. In some instances, the system may include the machine-learning engine 112 and/or the topology deployment system 110 described herein.

At 402, the machine-learning engine 112 may receive and prepare a large training data set of network topology data for network topologies previously deployed across multiple resource domains 120, as well as the corresponding operational data for the previously deployed topologies. The details of the previously deployed network topologies and corresponding operational data may include any combination of the network topology node and architecture data described above, and any or all of the operational data described in the above examples. As discussed above, in some examples the training data set also may include data corresponding to the desired state of the previously deployed network topologies associated with operational data. In some cases, the desired state data for the previously deployed network topologies may be determined based on the SLAs for the previously deployed network topologies, and may correspond to the intent or expected usage data for the network topologies.

At 404, the machine-learning engine 112 may select, generate, and/or customize the software code to implement one or more machine-learning algorithms to be used to train the machine-learning model. The machine-learning algorithms selected at 404 may include, for example, one or more regression algorithms, instance-based algorithms, Bayesian algorithms, decision tree algorithms, clustering algorithms artificial neural network algorithms, and/or deep learning algorithms.

At 406, the machine-learning engine 112 may generate the model and initiate the training process on the machine-learning model, using the training data received in 402.

At 408, the trained machine-learning model may be evaluated, using one or more testing data sets, during the trained model may be compared to an accuracy threshold for output predictions. As discussed above, in various embodiments the output predictions received from the trained model may correspond to one or more performance levels and/or one or more optimization recommendations for a deployed network topology. As shown in this example, the model training and evaluation processes at 406 and 408 may repeat iteratively until the model is deemed to be sufficiently trained.

At 410, the trained model may be deployed within the machine-learning engine. The trained model may correspond to model(s) 204 discussed above, and as described herein multiple different models may be used in some embodiments, such as models based on different algorithms, models initially designed/configured differently, models providing different outputs, models trained with different training data sets, etc.

Figure 5:
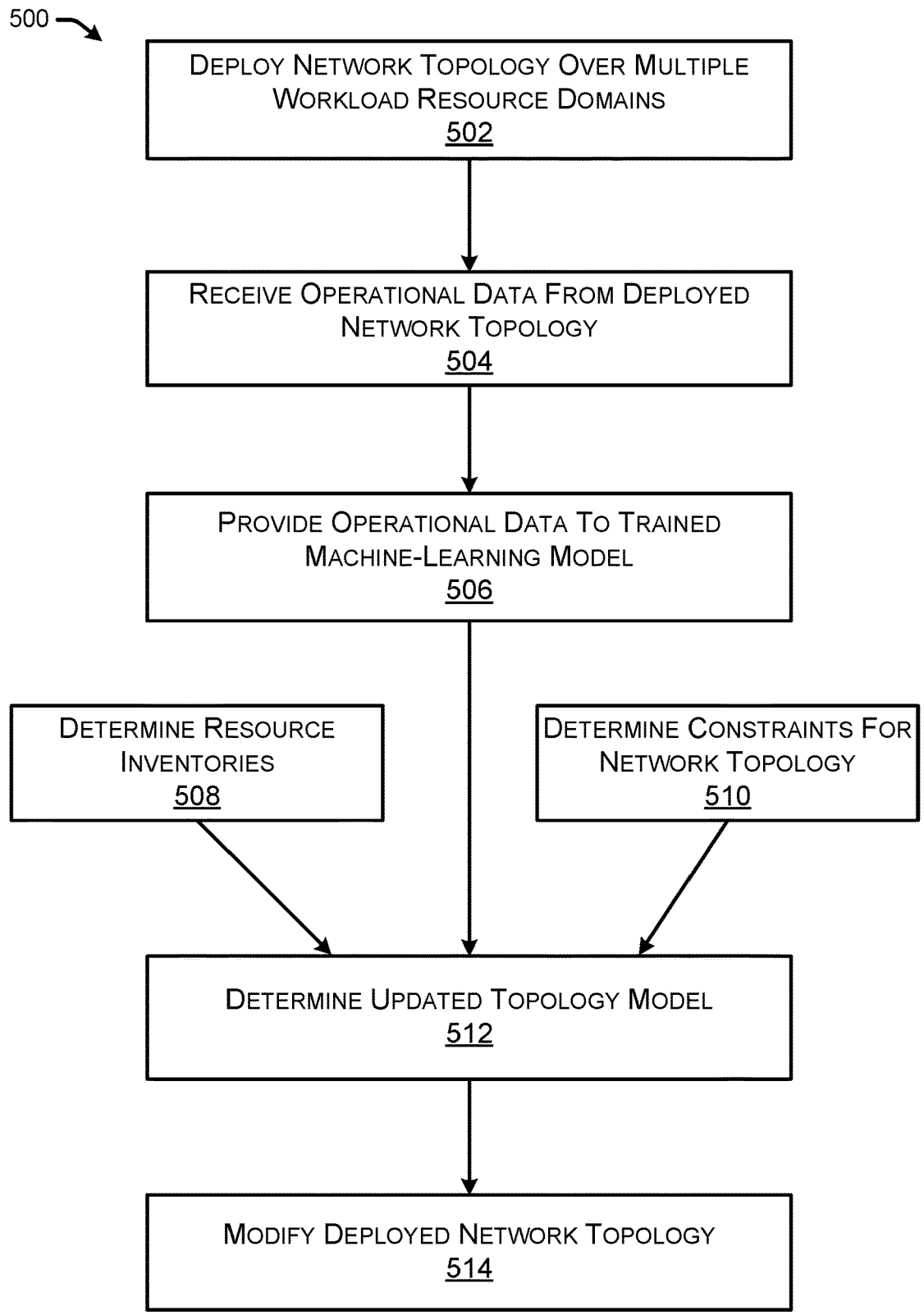
FIG. 5 illustrates a flow diagram of an example method for determining an updated topology model and modifying the deployed network topology, based on output from a machine-learning model trained based on operational data received from the deployed network topology, as well as constraint data and resource inventories for the workload resource domains.

FIG. 5 illustrates a flow diagram of an example method 500 for determining an updated topology model, and modifying a deployed network topology based on the updated topology model. As described above, the updated topology model may be determined based on the outputs from a machine-learning model trained using operational data received from the deployed network topology. In some embodiments, method 500 may be performed by a system including the topology deployment system 110 and/or the machine-learning engine 112 described herein.

At 502, a network topology may be initially deployed over multiple resource domains 120. As discussed above, the initial formal model may be determined based on a logical model input 206, constraints 208, and/or resource inventories 210, and the generation of the network topology may be performed using deployment instructions issued by a deployment generation engine 116 to the respective resource domains 120.

At 504, the topology deployment system 110 may receive operational data from the deployed network topology, including any combination of the operational data described herein. In some examples, along with the operational data for the deployed network topology received in operation 504, the topology deployment system 110 also may receive data identifying a desired state (or multiple desired states) of the deployed network topology associated with operational data. As discussed above, the desired state data for a deployed network topology may be determined based on the SLAs for the topology, and may correspond to the intent or expected usage data for the network topology.

At 506, the machine-learning engine 112 may access the trained machine-learning model 204 and provide the operational data received at 504 as input to the trained model. As described above, the output from the trained model may be provided to a model generation engine 114.

At 508, which may be optional in some embodiments, the model generation engine 114 may determine resource inventories for the applicable resource domains 120.

At 510, which also may be optional in some embodiments, the model generation engine 114 may determine one or more deployment constraints predefined for the deployed network topology.

At 512, the model generation engine 114 may determine an updated model for the network topology, based on the output from the trained model received at 506, and/or one or both of the resource inventory data determined at 508 or the deployment constraint data determined at 510.

At 514, a deployment generation engine 116 of the topology deployment system 110 may initiate the physical modification of the deployed network topology, by transmitting deployment instructions to the respective resource domains 120.

Figure 6A:
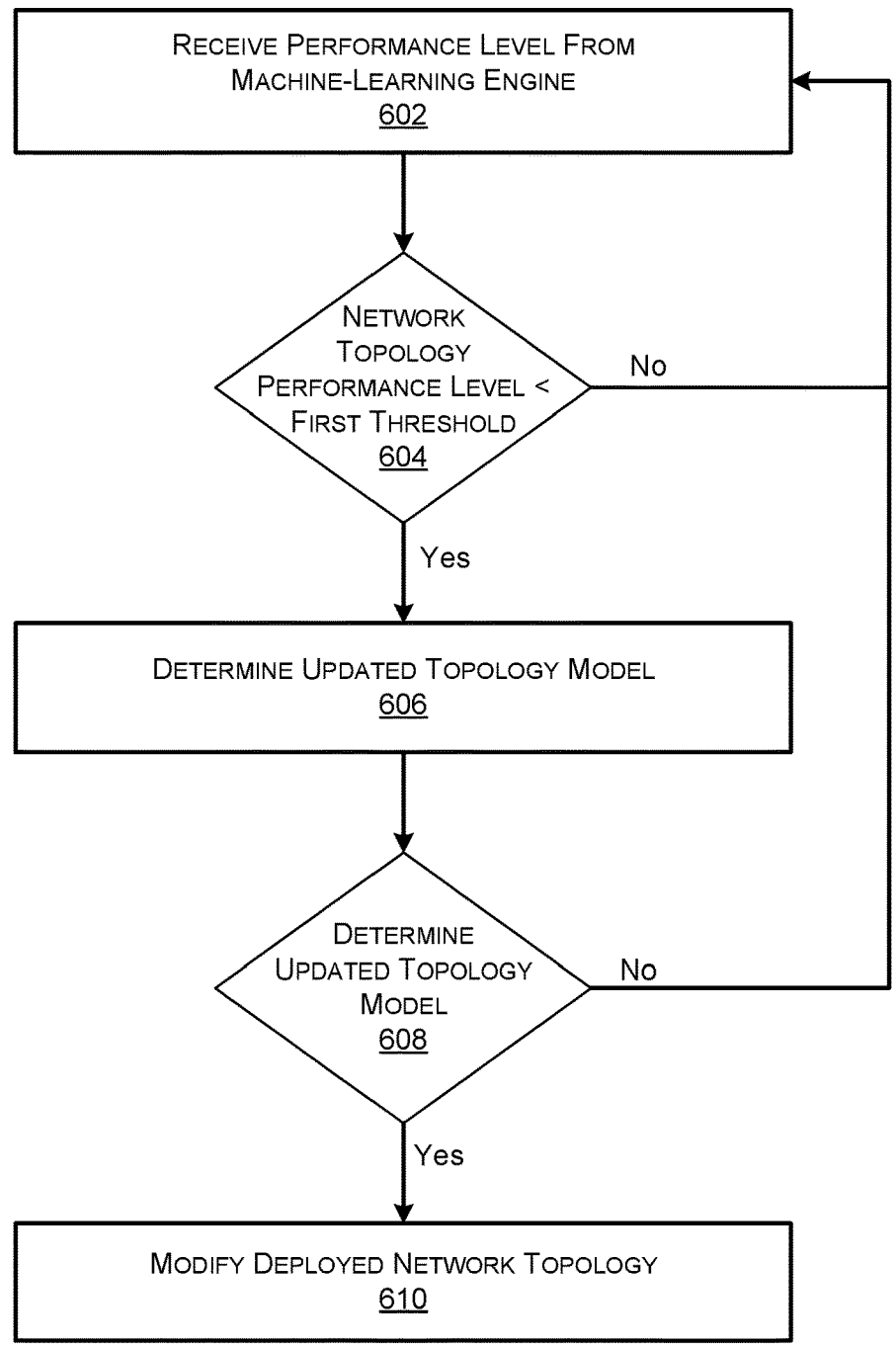
FIG. 6A illustrates a flow diagram of an example method for determining an updated topology model and modifying the deployed network topology based on a performance level of the deployed network topology received from a trained machine-learning model.
Figure 6B:
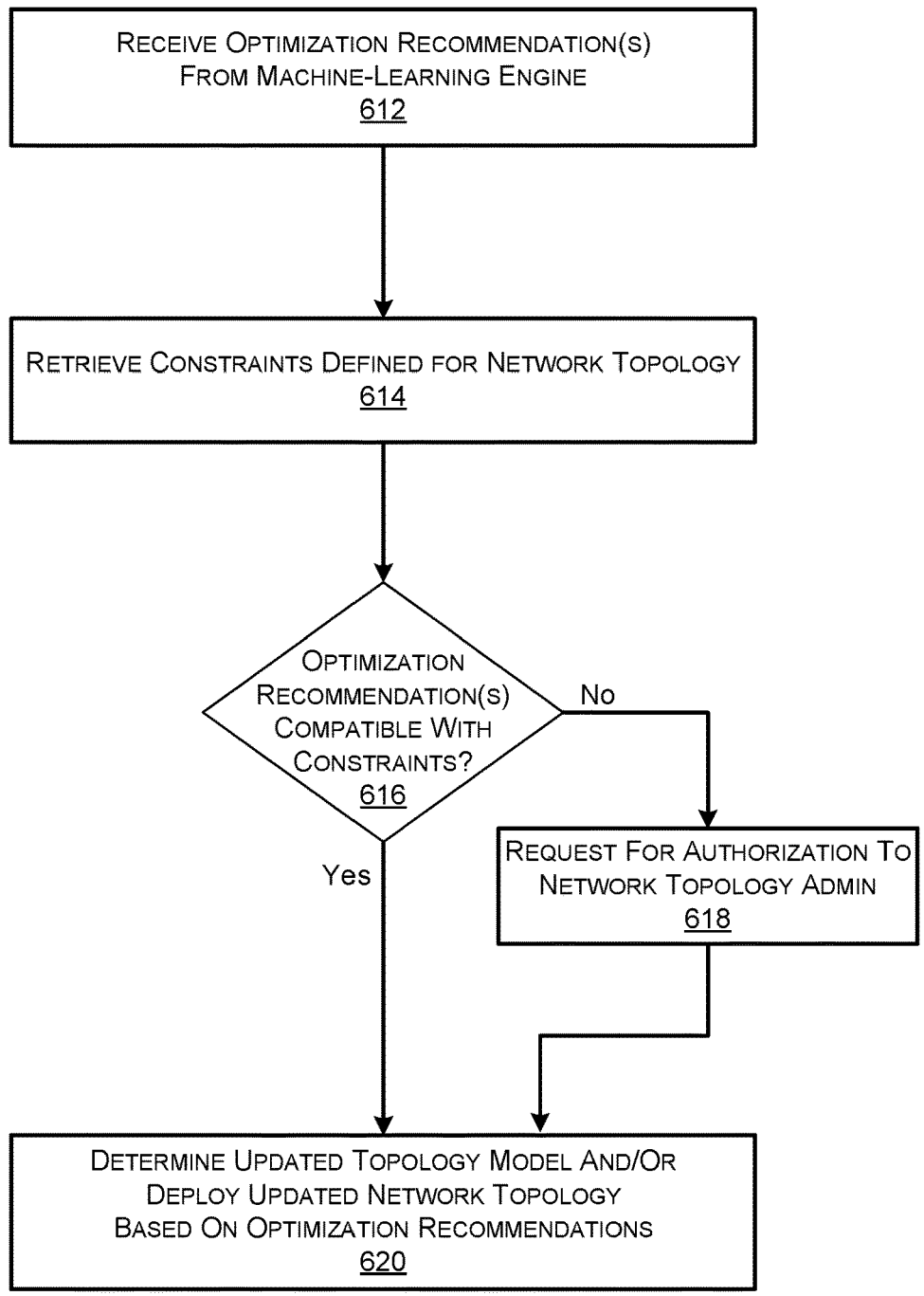
FIG. 6B illustrates a flow diagram of an example method for determining an updated topology model and modifying the deployed network topology based on optimization recommendations received from a trained machine-learning model.

FIGS. 6A and 6B respectively illustrate flow diagrams of example methods 600A and 600B, for determining an updated topology models and/or modifying a deployed network topology. As described in detail above, a trained machine-learning model 204 may be executed by a machine-learning engine 112, using operational data from a deployed network topology. In various embodiments, the output of the trained model 204 may include one or more performance metrics for the deployed network topology and/or optimization recommendations for the deployed network topology. FIG. 6A illustrates an example method 600A in which the trained model 204 outputs performance data of the deployed network topology, while FIG. 6B illustrates another example method 600B in which the trained model 204 outputs optimization recommendations. Example methods 600A and 600B may be alternatively in some embodiments, or in combination for trained models 204 (or sets of related models 204) that output both performance level data and optimization recommendations.

At 602 in FIG. 6A, a model generation engine 114 may receive performance level data from the machine-learning engine 112. The performance level data, which may be output by the trained model(s) 204, may include the current or recent performance levels for any nodes or groups of nodes within the network topology, or for the topology as a whole.

At 604, the performance levels received at 602 may be compared to a first predetermined performance threshold. If the received performance level(s) are above the first threshold, indicating no major performance degradations within the deployed network topology, then the process may return to 602 to await additional performance level data.

At 606, if the received performance level(s) are below the first threshold, indicating at least a minor performance degradation within the deployed network topology, then the model generation engine 114 may determine an updated formal model for the deployed network topology, using any of the various techniques described herein.

At 608, following the determination of the updated formal model, the performance levels received at 602 may be compared to a second predetermined performance threshold lower than the first threshold. If the received performance level(s) are above the second threshold, indicating only a minor performance degradation within the deployed network topology, then the process may return to 602 to await additional performance level data.

At 610, if the received performance level(s) are below both the first performance threshold level and the second performance threshold level, indicating a more serious performance degradation within the deployed network topology, then the topology deployment system 110 may proceed to modify the deployed network topology in accordance with the updated formal model created at 606. Thus, embodiments incorporating the techniques of method 600A may provide performance advantages by only selectively generating updated formals models and/or modifying deployed topologies, depending on the severity of a detected performance degradation.

At 612 in FIG. 6B, a model generation engine 114 may receive optimization recommendations from the machine-learning engine 112. As discussed above, the optimization recommendations may be output by the trained model(s) 204 based on the operational data received from the deployed network topology.

At 614, the model generation engine 114 may retrieve the deployment constraints 208 associated with the deployed network topology.

At 616, the model generation engine 114 may compare the optimization recommendations received at 612 to the constraints retrieved at 614. For example, an optimization recommendation received from the machine-learning engine 112 may identify one or more nodes to be migrated from a first resource domain 120A to a second resource domain 120B. However, an administrator-defined constraint input 208 may specify that the same node(s) are to be allocated on the first resource domain 120A only. Thus, in this example, the optimization recommendation would be incompatible with the constraint 208.

At 618, if one or more of the optimization recommendations received from the machine-learning engine 112 are determined to be incompatible with the constraints 208, then the model generation engine 114 may initiate an authorization request to a network topology administrator. Such authorization requests may be provided to the administrator user device 130 via a user interface, application programming interface (API) or other interaction portal.

At 620, if all optimization recommendations received from the machine-learning engine 112 are determined to be compatible with the constraints 208, and/or if administrator authorization has been received for any incompatible recommendations, then an updated topology model may be determined by the model generation engine 114 and/or the deployed network topology may be modified by the deployment generation engine 116.

Figure 7:
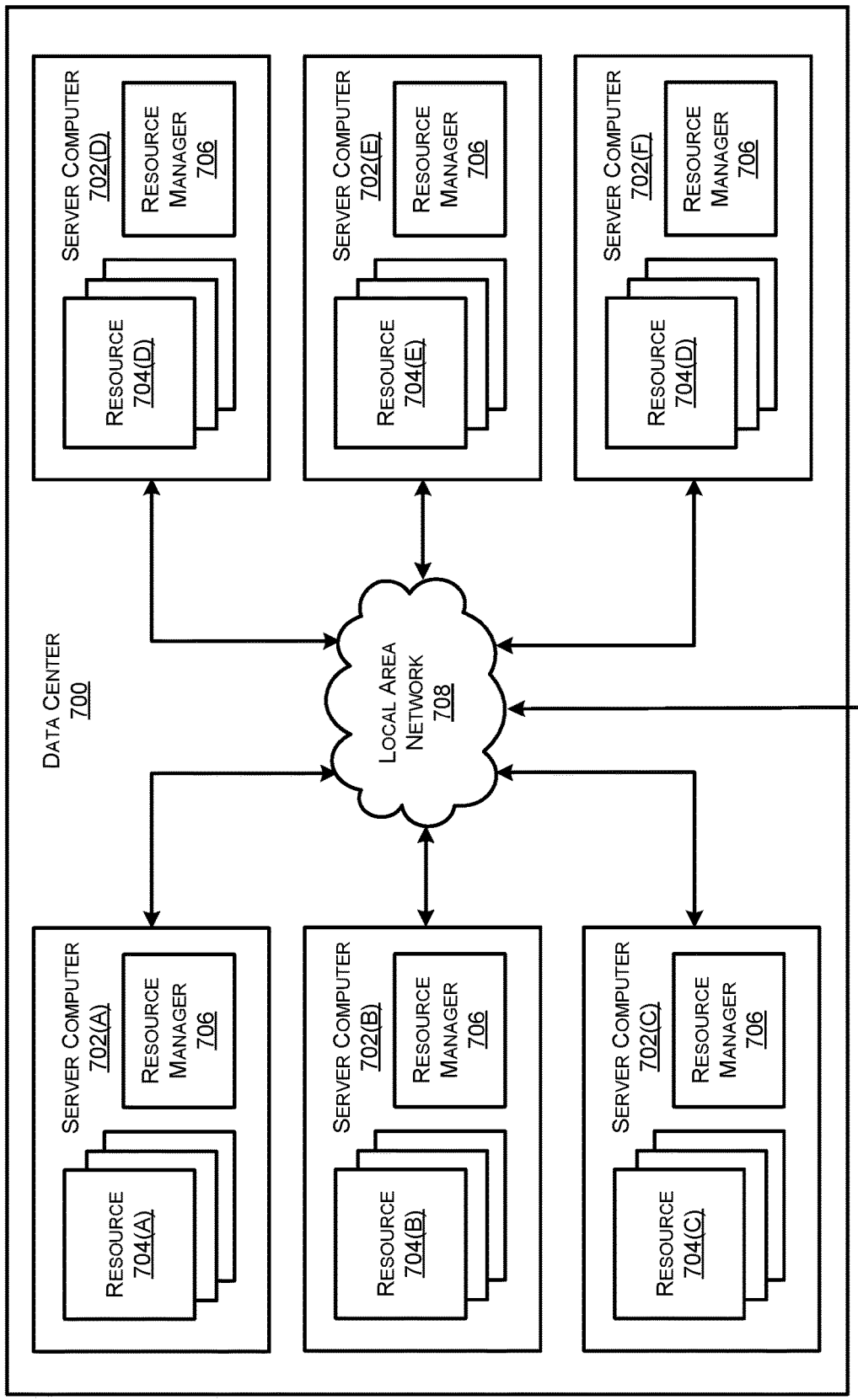
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, any of the servers or devices described above in reference to the computing environments 100 and 200. Although described as servers, the server computers 702 may comprise any type of networked device, such as servers, switches, routers, hubs, bridges, gateways, modems, repeaters, access points, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized. In some examples, the server computers 702 may each execute one or more application containers and/or virtual machines to perform techniques described herein.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations.

Figure 8:
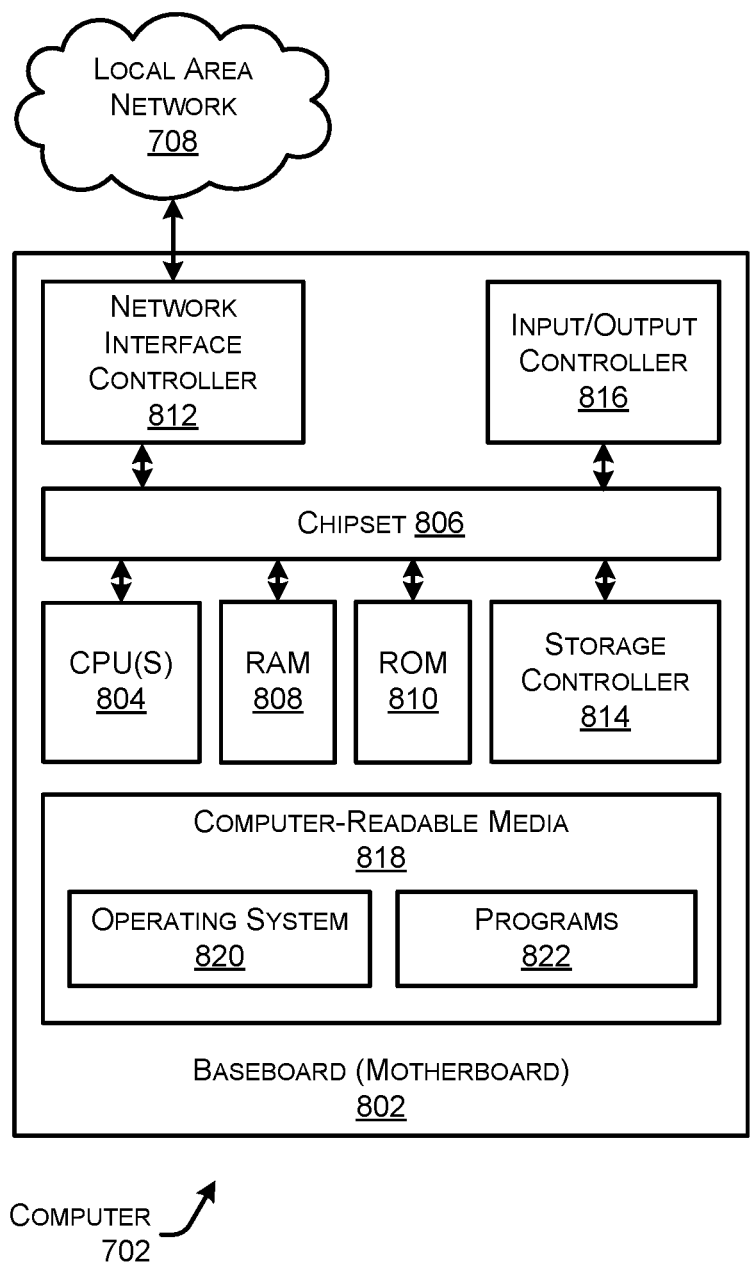
FIG. 8 is a computer architecture diagram showing an illustrative computer hardware architecture for implementing a server device that can be utilized to implement aspects of the various technologies presented herein.

FIG. 8 shows an example computer architecture for a server computer 702 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The server computer 702 may, in some examples, correspond to a physical server described herein, and may comprise networked devices such as servers, switches, routers, hubs, bridges, gateways, modems, repeaters, access points, etc.

The server computer 702 may correspond to any of the devices and servers described herein. In some examples, the server computer 702 may be configured to perform, potentially in conjunction with other server computers, the operations of the computing environment 100 and/or be included in the computing environment 100.

The computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 810 or NVRAM can also store other software components necessary for the operation of the computer 702 in accordance with the configurations described herein.

The computer 702 can operate in a networked environment using logical connections to remote computing devices and computer systems through a network, such as the network 708. The chipset 806 can include functionality for providing network connectivity through a NIC 812, such as a gigabit Ethernet adapter. The NIC 812 is capable of connecting the computer 702 to other computing devices over the network 708 (and/or 102). It should be appreciated that multiple NICs 812 can be present in the computer 702, connecting the computer to other types of networks and remote computer systems.

The computer 702 can be connected to a storage device 818 that provides non-volatile storage for the computer. The storage device 818 can store an operating system 820, programs 822, and data, which have been described in greater detail herein. The storage device 818 can be connected to the computer 702 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 702 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device 818 by detecting the physical states or characteristics of one or more particular locations within the physical storage units.

In addition to the mass storage device 818 described above, the computer 702 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 702.

In some examples, the operations performed by the hybrid computing environment 100, and or any components included therein, may be supported by one or more devices similar to computer 702. Stated otherwise, some or all of the operations performed by the hybrid computing environment 100, and or any components included therein, may be performed by one or more computer devices 702 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 702. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 818 can store other system or application programs and data utilized by the computer 702.

In one embodiment, the storage device 818 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above with regard to FIGS. 1-6. The computer 702 can also include computer-readable storage media having instructions stored thereupon for performing any of the other computer-implemented operations described herein.

The computer 702 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture completely different than that shown in FIG. 8.

As described herein, the computer 702 may comprise any of the network devices described herein. The computer 702 may include one or more hardware processors 804 (processors) configured to execute one or more stored instructions. The processor(s) 804 may comprise one or more cores. Further, the computer 702 may include one or more network interfaces configured to provide communications between the computer 702 and other devices, such as the communications described herein as being performed by the network devices, computing environment 100, etc. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure performed by the devices or servers in the computing environments 100 and 200. For instance, the programs 822 may cause the computer 702 to perform techniques for determining recommended software to run on the devices and servers.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing computer-executable instructions that, when executed by the one or more processors, cause the one or more processors to:
receive first operational data from a first node deployed in a first workload resource domain of a hybrid network topology deployed in a hybrid computing environment, wherein the hybrid network topology is based on an initial physical topology model, and wherein the first operational data includes a first resource usage metric;
receive second operational data from a second node deployed in a second workload resource domain of the hybrid network topology, wherein the second operational data includes a second resource usage metric;
provide at least the first operational data and the second operational data to a trained machine-learning model;
determine a performance metric associated with the hybrid network topology, based at least in part on an output of the trained machine-learning model;
determine an inventory of available resources associated with the hybrid computing environment;
determine an updated physical topology model based at least in part on (a) the inventory of available resources associated with the hybrid computing environment, and (b) the performance metric associated with the hybrid network topology;
verify the functional equivalence of the updated physical topology model to the initial physical topology model; and
modify the hybrid network topology deployed in the hybrid computing environment based on the updated physical topology model.

2. The system of claim 1, the non-transitory computer-readable media storing further computer-executable instructions that, when executed by the one or more processors, cause the one or more processors to:
provide desired state data for the hybrid network topology to the trained machine-learning model, wherein the output from the trained machine-learning model is based at least in part on the desired state data.

3. The system of claim 1, wherein the hybrid network topology comprises one or more compute nodes and one or more network nodes operating within each of a plurality of workload resource domains, and wherein the first resource usage metric and the second resource usage metric each comprises at least one of:
resource utilization data associated with the one or more compute nodes operating within each of the plurality of workload resource domains;
bandwidth utilization data associated with the one or more network nodes operating within each of the plurality of workload resource domains;
resource cost data received from at least one of the workload resource domains;
updated application data received from at least one of the workload resource domains;
tenant characteristic data received from at least one of the workload resource domains; or
a received number of support issues associated with the hybrid network topology over a previous time period.

4. The system of claim 1, wherein the output received from the trained machine-learning model comprises an optimization recommendation for the initial physical topology model.

5. The system of claim 1, the non-transitory computer-readable media storing further computer-executable instructions that, when executed by the one or more processors, cause the one or more processors to:
retrieve one or more deployment constraints associated with the hybrid network topology,
wherein the updated physical topology model is determined based at least in part on (a) the inventory of available resources associated with the computing environment, (b) the output from the trained machine-learning model, and (c) the or more deployment constraints associated with the hybrid network topology.

6. The system of claim 5, the non-transitory computer-readable media storing further computer-executable instructions that, when executed by the one or more processors, cause the one or more processors to:
determine a first optimization recommendation for the hybrid network topology, based on the output received from the trained machine-learning model;
determine whether the first optimization recommendation is compatible with the one or more deployment constraints associated with the hybrid network topology; and
in response to determining that the first optimization recommendation is not compatible with the one or more deployment constraints, transmit an authorization request identifying the first optimization recommendation to an administrator of the hybrid network topology.

7. The system of claim 1, the non-transitory computer-readable media storing further computer-executable instructions that, when executed by the one or more processors, cause the one or more processors to:
determine a performance level associated with the hybrid network topology, based on the output received from the trained machine-learning model;
compare the performance level to a first performance threshold associated with the hybrid network topology; and
initiate a first process to determine the updated topology model, in response to a determination that the performance level does not exceed the first performance threshold.

8. The system of claim 7, the non-transitory computer-readable media storing further computer-executable instructions that, when executed by the one or more processors, cause the one or more processors to:
compare the performance level to a second performance threshold associated with the hybrid network topology; and
initiate a second process to modify the hybrid network topology deployed in the computing environment, in response to a determination that the performance level does not exceed the second performance threshold.

9. The system of claim 1, the non-transitory computer-readable media storing further computer-executable instructions that, when executed by the one or more processors, cause the one or more processors to:
after modifying the hybrid network topology in the hybrid computing environment, receive additional operational data from the modified hybrid network topology;
provide the additional operational data to the trained machine-learning model;
receive a second output from the trained machine-learning model in response to the additional operational data;
determine a second updated physical topology model based at least in part on (a) the inventory of available resources associated with the computing environment, and (b) the second output from the trained machine-learning model; and
perform a second modification of the hybrid network topology to correspond to the second updated physical topology model.

10. A method comprising:
receiving, by a deployment computing system, first operational data from a first node deployed in a first workload resource domain of a hybrid network topology deployed in a hybrid computing environment, wherein the hybrid network topology is based on an initial physical topology model, and wherein the first operational data includes a first resource usage metric;
receiving, by the deployment computing system, second operational data from a second node deployed in a second workload resource domain of the hybrid network topology, wherein the second operational data includes a second resource usage metric;
providing, by the deployment computing system, at least the first operational data and the second operational data to a trained machine-learning model;
determining, by the deployment computing system, a performance metric associated with the hybrid network topology, based at least in part on an output from the trained machine-learning;
determining, by the deployment computing system, an inventory of available resources associated with the hybrid computing environment;
determining, by the deployment computing system, an updated physical topology model based at least in part on (a) the inventory of available resources associated with the hybrid computing environment, and (b) the performance metric associated with the associated with the hybrid network topology;
verifying, by the deployment computing system, the functional equivalence of the updated physical topology model to the initial physical topology model; and
modifying, by the deployment computing system, the hybrid network topology deployed in the hybrid computing environment based on the updated physical topology model.

11. The method of claim 10, further comprising:
providing, by the deployment computing system, desired state data for the hybrid network topology to the trained machine-learning model, wherein the output from the trained machine-learning model is based at least in part on the desired state data.

12. The method of claim 10, wherein the hybrid network topology comprises one or more compute nodes and one or more network nodes operating within each of a plurality of workload resource domains, and wherein the first resource usage metric and the second resource usage metric each comprises at least one of:
resource utilization data associated with the one or more compute nodes operating within each of the plurality of workload resource domains;
bandwidth utilization data associated with the one or more network nodes operating within each of the plurality of workload resource domains;
resource cost data received from at least one of the workload resource domains;
updated application data received from at least one of the workload resource domains;
tenant characteristic data received from at least one of the workload resource domains; or
a received number of support issues associated with the hybrid network topology over a previous time period.

13. The method of claim 10, wherein the output received from the trained machine-learning model comprises an optimization recommendation for the initial physical topology model.

14. The method of claim 10, further comprising:
retrieving one or more deployment constraints associated with the h network topology, wherein the updated physical topology model is determined based at least in part on (a) the inventory of available resources associated with the computing environment, (b) the output from the trained machine-learning model, and (c) the or more deployment constraints associated with the hybrid network topology.

15. The method of claim 14, further comprising:
determining a first optimization recommendation for the hybrid network topology, based on the output received from the trained machine-learning model;
determining whether the first optimization recommendation is compatible with the one or more deployment constraints associated with the hybrid network topology; and
in response to determining that the first optimization recommendation is not compatible with the one or more deployment constraints, transmit an authorization request identifying the first optimization recommendation to an administrator of the hybrid network topology.

16. The method of claim 10, further comprising:
determining a performance level associated with the hybrid network topology, based on the output received from the trained machine-learning model;
comparing the performance level to a first performance threshold associated with the hybrid network topology; and
initiating a first process to determine the updated physical topology model, in response to a determination that the performance level does not exceed the first performance threshold.

17. The method of claim 16, further comprising:
comparing the performance level to a second performance threshold associated with the hybrid network topology; and
initiating a second process to modify the hybrid network topology deployed in the computing environment, in response to a determination that the performance level does not exceed the second performance threshold.

18. The method of claim 10, further comprising:
after modifying the hybrid network topology in the hybrid computing environment, receive additional operational data from the modified hybrid network topology;
providing the additional operational data to the trained machine-learning model;
receiving a second output from the trained machine-learning model in response to the additional operational data;
determining a second updated physical topology model based at least in part on (a) the inventory of available resources associated with the computing environment, and (b) the second output from the trained machine-learning model; and
performing a second modification of the hybrid network topology to correspond to the second updated physical topology model.

19. A non-transitory computer-readable medium storing processor-executable instructions that, when executed by one or more processors, cause the one or more processors to perform operations comprising:
receiving first operational data from a first node deployed in a first workload resource domain of a hybrid network topology deployed in a hybrid computing environment, wherein the hybrid network topology is based on an initial physical topology model, and wherein the operational data includes a first resource usage metric;
receiving second operational data from a second node deployed in a second workload resource domain of the hybrid network topology, wherein the second operational data includes a second resource usage metric,
providing at least the first operational data and the second operational data to a trained machine-learning model;
determining a performance metric associated with the hybrid network topology, based at least in part on an output from the trained machine-learning model;
determining an inventory of available resources associated with the hybrid computing environment;
determining an updated physical topology model based at least in part on (a) the inventory of available resources associated with the hybrid computing environment, and (b) the performance metric associated with the hybrid network topology,
verifying the functional equivalence of the updated physical topology model to the initial physical topology model; and
modifying the hybrid network topology deployed in the hybrid computing environment based on the updated physical topology model.

20. The non-transitory computer-readable medium of claim 19, wherein the hybrid network topology comprises one or more compute nodes and one or more network nodes operating within each of a plurality of workload resource domains, and wherein the first resource usage metric and the second resource usage metrics each comprises at least one of:
resource utilization data associated with the one or more compute nodes operating within each of the plurality of workload resource domains;
bandwidth utilization data associated with the one or more network nodes operating within each of the plurality of workload resource domains;
resource cost data received from at least one of the workload resource domains;
updated application data received from at least one of the workload resource domains;
tenant characteristic data received from at least one of the workload resource domains; or
a received number of support issues associated with the hybrid network topology over a previous time period.

* * * * *